Figures 1, 2:
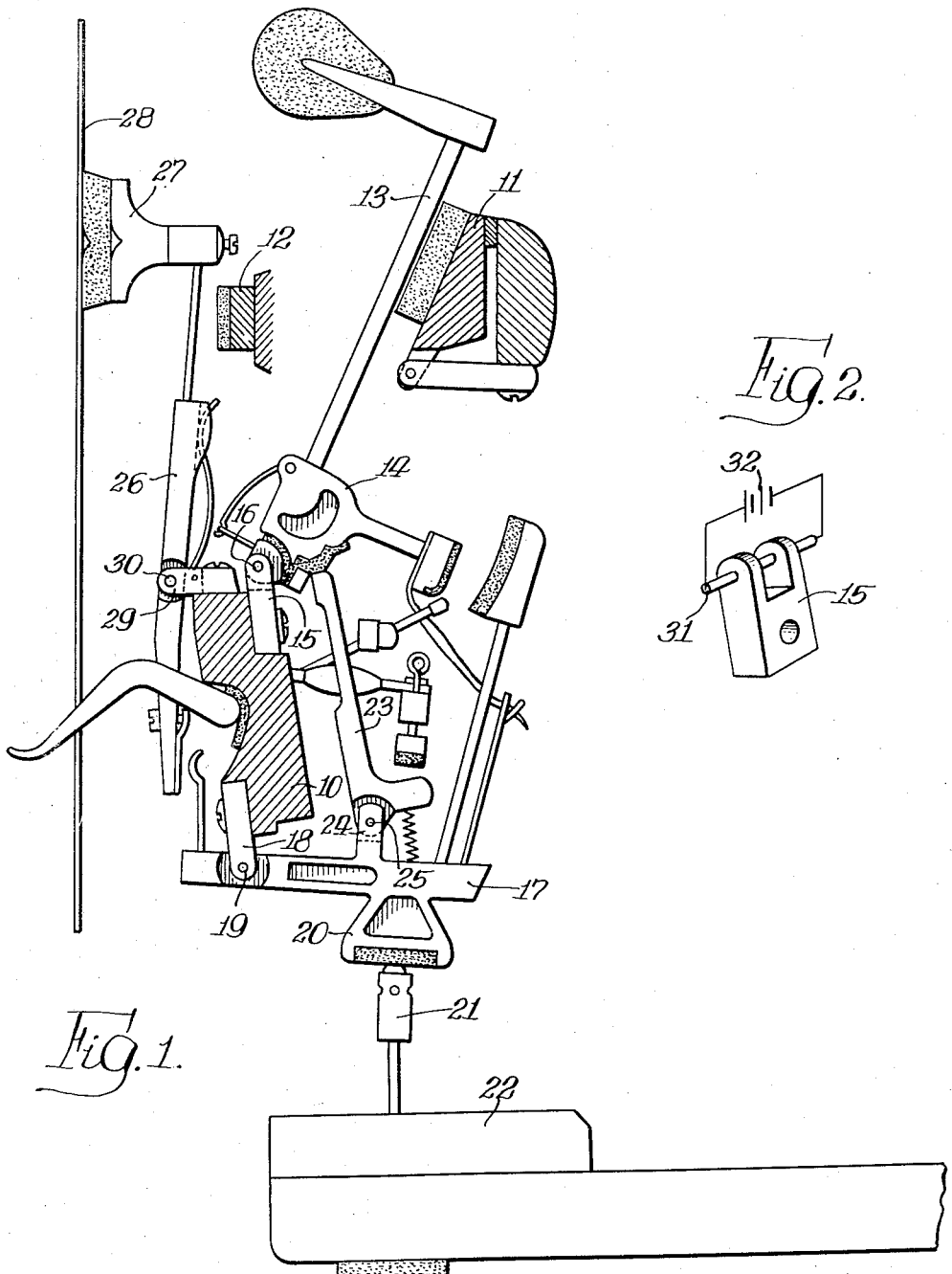

April 14, 1959

R. G. GADEBUSCH 2,881,509

PLASTIC PIANO ACTION

Filed Nov. 14, 1955

INVENTOR.
Richard Gustave Gadebusch
BY
Mueller and Aichele
Attys.

2,881,509
PLASTIC PIANO ACTION

Richard Gustave Gadebusch, Arvika, Sweden

Application November 14, 1955, Serial No. 546,700

Claims priority, application Germany November 27, 1954

2 Claims. (Cl. 29—149.5)

This invention relates generally to actions for musical instruments such as pianos and more particularly to a method of making pivotal bearings for actions constructed of plastic materials.

Heretofore, piano actions have generally been made of wood such as white birch or maple, and the axle bores therein were lined with felt or cassimere since the holes cannot be drilled in wood members without considerable tolerances. That is, to compensate for the tolerances in the drilled holes, the bores in which the pivot pins are mounted were provided with a textile lining. The pivot pin generally is fixed in the member to be rotatably mounted, that is, the damper arm, the hammer butt, the flyjack, or hopper, and the lifter or whippen, while it must be easily rotatable without play in the bores of the bearings of the fixed mounting brackets or flanges.

The construction just described has a serious disadvantage in that moisture is absorbed by the textile lining causing binding of the pivot pin. This happens especially in tropical countries. Also the manufacture of this construction is expensive both in material and labor. Finally, the textile lining will wear out with prolonged use to require repair or replacement of the action.

It is an object of the present invention materially to improve the manufacture of bearings in actions made of plastic materials, and to make unnecessary linings with textile material in the bores of such actions.

Another object of the invention is to provide an improved method for providing a smooth axle bearing in members made of plastic material.

A feature of the invention is the provision of accurate bearings in plastic materials by forming a hole in the plastic material which is slightly smaller than the pivot pin, inserting an auxiliary pivot pin of slightly larger diameter into the hole, heating the auxiliary pin so that the plastic material is heated and surrounds the pin with a close fit, removing the auxiliary pin, and inserting the final pin which is of the same diameter as the auxiliary pin. Such bearings may be provided in the damper bracket, the hammer butt bracket, the lifter bracket, and the bracket for supporting the hopper or flyjack.

Another feature is the provision of a method for making bearings in plastic materials wherein undersize holes are drilled in the plastic material, electrically conducting pins are placed in the holes, current is passed through the pins to heat the plastic and provide a smooth bearing about the pins, the pins are removed and replaced by final pins, and the final pins have the ends cut off smooth so that they will not bind in the plastic bearing.

Further objects, features and the attending advantages of the invention will be apparent from a consideration of the following description when taken in connection with the accompanying drawings in which:

Fig. 1 illustrates a piano action in which the improved bushingless bearings may be used, and Fig. 2 illustrates the forming of the bearing in the bracket for supporting the hammer butt.

The invention can be embodied in various ways. It is particularly adaptable for use in piano actions and is illustrated in a piano action of the upright type. It will be apparent that the improved bearings in accordance with the invention may be used in actions of pianos of other types and in other musical instruments.

Referring now more particularly to the drawings in Fig. 1 there is illustrated a piano action including fixed rails, 10, 11 and 12. Mounted on the fixed rail 10 is a hammer 13 having a butt 14 pivotally connected to flange 15. The connection of the butt 14 and the flange 15 is made through a pivot pin 16. For operating the hammer 13, a lifter or whippen 17 is provided which is also pivotally mounted on the fixed rail 10, being connected to flange 18 by pivot pin 19. The lifter 17 includes a lower portion 20 for engagement by a capstan 21 secured to the rear end of a piano key 22. Accordingly, as the key is operated and the front end thereof is depressed, the rear end is raised so that the capstan 21 lifts the lifter 17.

Pivotally secured to the lifter 17 is a hopper or flyjack 23 adapted to engage the hammer butt 14. The hopper is pivotally connected to projection 24 on lifter 17 through pivot pin 25. A damper 26 is provided having a head 27 normally in engagement with the piano string 28. The damper 26 is pivotally secured to flange 29 by pivot pin 30. The action includes a back check, let-off and other components which are well known and which function in this usual manner. These will not be described since they form no part of the present invention.

In accordance with the present invention, the mounting brackets or flanges for supporting the movable parts of piano actions are made from thermoplastic materials such as cellulose compounds, cellulose acetate and cellulose acetate butyrate being examples of materials which have been found to be satisfactory.

Holes are formed in these fixed mounting brackets which are of slightly smaller diameter than the pivot pins to be used. The holes may be formed in the plastic members by the use of automatic drills. Such holes are provided in the flanges 15, 18 and 29 and in the projection 24 of the piano actions illustrated in Fig. 1 which are made of plastic material.

Into the holes formed in the plastic members, electrically conductive auxiliary pivot pins which are slightly larger than the diameter of the holes are inserted. Fig. 2 illustrates the flange 15 with an auxiliary pin 31 inserted therein. The flange is of fork shape and the pin extends into both branches providing a space for supporting the movable part therebetween. The auxiliary pin is heated as by passing an electric current therethrough. Fig. 2 shows a battery 32 connected to the ends of the auxiliary pivot pin 31 for passing an electric current therethrough which heats the pin 31. As a result of the indirect heating of the plastic material of the bearing parts, the plastic material will be caused to exactly fit about the auxiliary pivot pin. The auxiliary pin is then removed and the pivot pin actually used in the action is inserted in the holes. The pivot pins used are of the same diameter as the auxiliary pivot pins and may be made from a material such as nickel silver.

The pivot pins may be secured in the movable parts such as the hammer butt 14, damper 26, lifter 17 and hopper 23 by providing bores in such parts which are substantially smaller than the pivot pins. The pivot pins are thus rigidly held in the movable parts after insertion. These parts into which the pivot pins are fixed need not be made of plastic material and may be made of wood as in standard actions without affecting the bearing arrangement.

When the pivot pins are positioned in the bearing holes which have been smoothed by heating of the auxiliary pivot pins, and through the smaller openings of the other member of the pivotal connection, the projecting portions of the pivot pins may be milled off by machine. This is preferable to cutting off the ends with pliers as has been the usual practice. This is because the ends of pivot pins cut off by pliers may have sharp ridges which bear against the ends of the brackets which forms the bearings for the pins and may scratch the bracket and cause friction therewith. It is also possible to use pins which are pre-cut to the required length so that no projecting portions need be removed. In such case, the pivot pins may be pressed in automatically by machine.

Alternatively, it is possible to reverse the pivotal arrangement so that the holes providing the smooth bearing surface are provided in the rotatably mounted parts that is, the hammer butt, the damper, the lifter and the hopper, instead of in the fixed mounting bracket for these parts. In such case, the movable parts must be made of plastic material, and the forming of the bearing bore therein, will be accomplished in the manner specified above with respect to the fixed mounting flanges.

In constructions which have been used, the undersized holes drilled in the stationary bearing brackets were 1.28 millimeters in diameter. The pivot pins had a diameter of 1.285 millimeters with a tolerance of plus or minus .002 millimeter. This applies to both the auxiliary pins and the pivot pins actually used. The bores in the movable parts into which the pivot pins were fixed, had a diameter of only 1 millimeter. These dimensions are merely examples and other dimensions may be used as required in various different applications.

The invention achieves an extremely accurate and neat mounting of the pivot pins for rotatable parts of piano actions. The construction in accordance with the invention presents the advantage that no swelling can occur as the felt linings normally used are eliminated, and the pivot pins move in the smooth plastic bearings without play. More particularly, the pivot pins do not cause any widening out of the bearings after repeated use. Finally, manufacture of this bearing construction is much cheaper and is technically simpler.

I claim:

1. The method of making a pivot bearing having a part made of thermoplastic material in which a pivot pin is rotatably mounted, said method including the steps of, forming a cylindrical hole in the thermoplastic part, forcing into the hole an auxiliary cylindrical pin having a diameter slightly larger than that of the hole, applying heat directly to the pin so that the adjacent thermoplastic material surrounds the pin with a close but freely rotatable fit, removing the auxiliary pin, and finally placing in the hole another cylindrical pin of bearing material having the same diameter as the auxiliary pin to provide a close-fitting, freely rotatable pivotal connection between the pin and the plastic part.

2. The method of making a pivot bearing having a part of homogeneous thermoplastic material of substantial thickness in which a pivot pin is rotatably mounted, said method including the steps of forming a cylindrical hole through said thermoplastic part, forcing into and through the hole an auxiliary cylindrical pin of electrically conducting material having a diameter slightly larger than that of the hole, said pin being substantially longer than the thickness of the part, stopping the movement of the pin with both its ends projecting substantially from both the opposite ends of the hole, connecting the projecting opposite ends of the pin in an electric circuit to send through the pin an electric current effective to heat the pin and thereby to soften the adjacent thermoplastic material so that it surrounds the pin with a close but freely rotatable fit, interrupting the circuit, removing the conducting pin, and finally placing in the hole another cylindrical pin of bearing material having the same diameter as the conducting pin, to provide a close-fitting, freely rotatable pivotal connection between the bearing pin and the thermoplastic part.

References Cited in the file of this patent
UNITED STATES PATENTS

| 1,103,382 | Seifert | July 14, 1914 |
| 2,641,828 | Knoblaugh | June 16, 1953 |
| 2,679,913 | Scott | June 1, 1954 |